Oct. 31, 1939.   F. SCHILGEN   2,177,841
MEANS FOR CONVERTING DIRECT CURRENT INTO ALTERNATING CURRENT
Filed Nov. 11, 1937

INVENTOR
FRITZ SCHILGEN
BY
ATTORNEY

Patented Oct. 31, 1939

2,177,841

UNITED STATES PATENT OFFICE 2,177,841

MEANS FOR CONVERTING DIRECT CURRENT INTO ALTERNATING CURRENT

Fritz Schilgen, Berlin-Wilmersdorf, Germany, assignor to Telefunken Gesellschaft für Drahtlose Telegraphie m. b. H., Berlin, Germany, a corporation of Germany Application November 11, 1937, Serial No. 173,994
In Germany November 2, 1936

4 Claims. (Cl. 171—97)

The present day vibrators operate on the principle of making and breaking contact, whereby the impressed direct current potential is applied by means of a vibrating reed, to each side of a centertapped primary winding of a transformer. In parallel with one contact is a magnet winding which attracts the reed and as a result of parallel contact, becomes periodically short-circuited. For connection of the vibrator to various D. C. potentials of a battery or power line, it is necessary that the primary winding of the transformer be provided with taps and furthermore the magnet winding must also be made adjustable for the different potentials.

This is not only troublesome but furthermore requires a relatively large space for such magnet-coil winding.

Figure 1:
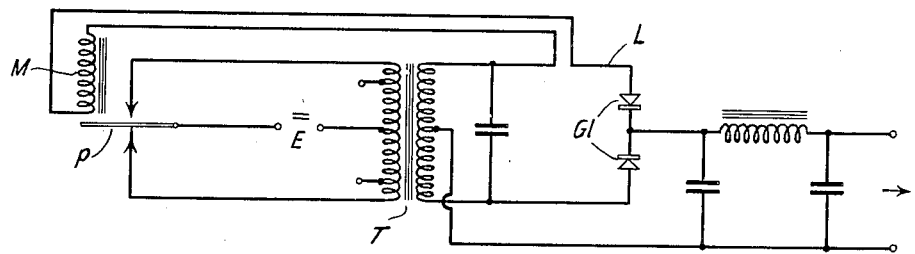
Figure 2:
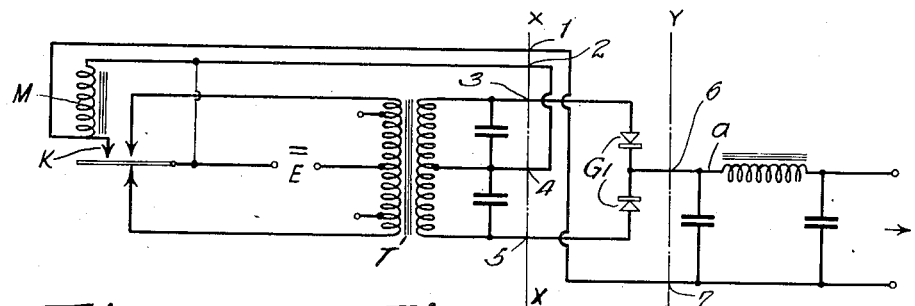
Figure 2:
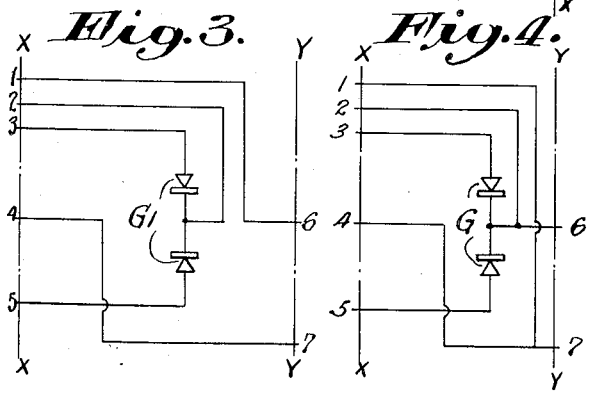
Figure 2:
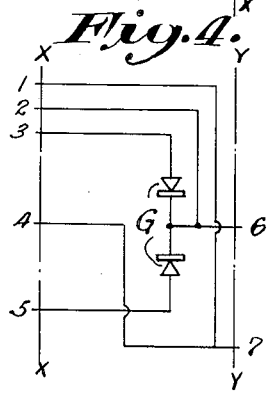
Figure 2:
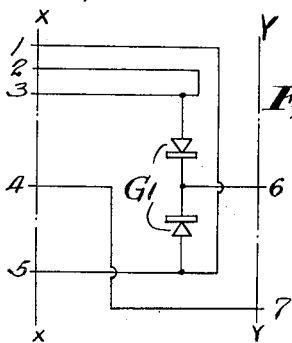

Referring to the drawing accompanying the specification, Fig. 1 illustrates the invention applied to a full wave rectifier and showing the driver coil in series with the secondary winding of the transformer; in Fig. 2 the invention is illustrated by a circuit diagram showing the driver winding across the center tap lead of the secondary winding; Fig. 3 illustrates a circuit arrangement wherein the magnet coil is placed in series in the output end of the rectifier; in Fig. 4 the magnet winding or driver coil is connected across the rectified output of the dvice; and, in Fig. 5 the driver coil is placed in parallel with the secondary of the transformer.

According to the present invention a simpler way is suggested whereby the magnet coil serving as a driver of the vibrator is placed in series with or diagonally across the secondary winding of the transformer, the primary of which has taps for different D. C. supply potentials and the reed when in neutral position, rests upon a contact of the primary winding thereby forming a closed circuit which opens as soon as the magnet coil becomes energized. This last feature implies, that the magnet coil is energized by the "on" current impulse.

When alternating current is drawn from the secondary without subsequent rectification, it is either necessary to use a polarized magnet or else an ordinary magnet and a short-circuiting contact acted upon by the reed, in order that the latter be only attracted by the magnet during one-half cycle of the produced alternating current potential.

In case of subsequent full-wave or half-wave rectification, the magnet winding is either connected in one of the sides of the circuit immediately following the secondary winding or in case of full-wave rectification it is connected in the centertap lead of the secondary providing at the same time a short-circuiting contact for the magnet coil which contact is actuated by the reed of the vibrator.

Several of the mentioned circuit arrangements are illustrated in the diagram. In Fig. 1 the vibrator reed is marked P and the magnet coil is marked M. The D. C. potential is applied across terminals E. The two rectifiers G1 give full wave rectification. Since in line L current only flows during one-half cycle of the produced sine wave, the magnet will be energized (excited) only during that half cycle.

The polarity of the windings, i. e., the connection across the contacts and the primary taps must be such that the current will only flow in the line L when the reed rests on the lower contact.

In Figure 2 a different circuit is given, where the magnet winding M is placed across the centertap lead of the secondary winding. Since in this lead current flows during the entire cycle, an additional contact K is provided, which shorts out the magnet during one-half cycle. This arrangement as compared with the one in Fig. 1 has the disadvantage, however, that an additional contact must be provided, but on the other hand, the circuit is symmetrical.

In cases where very little current flows in the secondary, the magnet must be very sensitive. Furthermore, its winding must have a low time constant when the produced alternating current is rectified and consequently the resulting current impulses are short. There are still other arrangements possible. For example, the magnet coil can also be placed in line (a) of Figure 2 as shown in Fig. 3 or across the terminals of the rectified output as shown in Fig. 4. Naturally in the arrangement shown in Fig. 4 the magnet winding is not shorted out by the additional contact K, but the current flow in the magnet winding is interrupted.

Furthermore, it is also possible to place the magnet winding in parallel with the secondary of the transformer T as shown in Fig. 5, but this is less favorable of course.

In cases where the magnet winding is placed in the secondary circuit and the load increases slowly after turning on the current (for example as a result of indirect heating of cathodes) a compensating load must be available. A suitable device for this purpose is disclosed in co-pending application Serial No. 173,764, filed November 10, 1937.

I claim:

1. In apparatus for converting low voltage direct current into comparatively high voltage alternating current, a vibrator, a magnet coil for driving the vibrator, a transformer having a primary winding including means for connection thereof to said vibrator and a secondary winding connected to a load, said means comprising a plurality of taps for adapting said apparatus for connection to direct current sources of different voltage and means for connecting said magnet winding in series with said load and at least a portion of said secondary winding whereby the voltage applied across the magnet winding is substantially the same for each of said direct current source voltages for which the apparatus is adapted.

2. In an arrangement for converting direct current into alternating current, a transformer provided with primary and secondary windings, a pair of contacts one thereof being connected to one end of the primary of the transformer, the other of said contacts being connected to the other end of said primary winding, a member adapted to be vibrated between said two contacts, a pair of input terminals between which is adapted to be connected a source of direct current, means connecting one of said terminals to a point of the primary winding intermediate the two ends thereof, means for connecting the other input terminal to said member, a magnet coil for driving said member, a pair of output terminals, means including said magnet coil for connecting one end of the secondary winding of the transformer to one of the output terminals, means for connecting the other terminal of the secondary winding to said last named output terminal and means for connecting the other output terminal to a point which is intermediate the two ends of the secondary winding.

3. In an arrangement for converting direct current into alternating current, a transformer provided with a primary winding and a secondary winding, a vibrator device including a pair of contacts and a vibrating element adapted to be vibrated between said contacts, said vibrating element being normally in contact with one of said contacts when the vibrator device is at rest, means for driving the vibrator comprising a magnet coil, a pair of input terminals between which is adapted to be connected a source of direct current, means for connecting one of said terminals to an intermediate point of the primary winding, means for connecting the other input terminal to said vibrator, a pair of output terminals across which is adapted to be connected a load, means including said magnet coil and a rectifier in series for connecting one end of the secondary winding of the transformer to one of said output terminals, means including a rectifier for connecting the other end of the secondary winding to said last named output terminal, a condenser shunted across said secondary winding and means for connecting an intermediate point of the secondary winding to the other of said output terminals.

4. In a power supply system for signalling apparatus and the like, a pair of terminals adapted for connection to a source of direct current, a transformer including a primary portion and a secondary portion, a substantially central tapping point on said primary portion of the transformer, a connection between one of said terminals and said central tapping point, a vibrator unit comprising an armature, a pair of contact points between which the armature is vibrated and a magnet winding for driving the armature, means for connecting the other of said terminal to said armature, taps on said primary portion of the transformer located on either side of said central point, means for connecting one of the contact points to one of the taps on one side of the central tapping point and the other contact point to a tap on the other side of said central tapping point, a load circuit including said magnet winding and means for connecting said load circuit across the secondary portion of said transformer.

FRITZ SCHILGEN.